Figure 10:
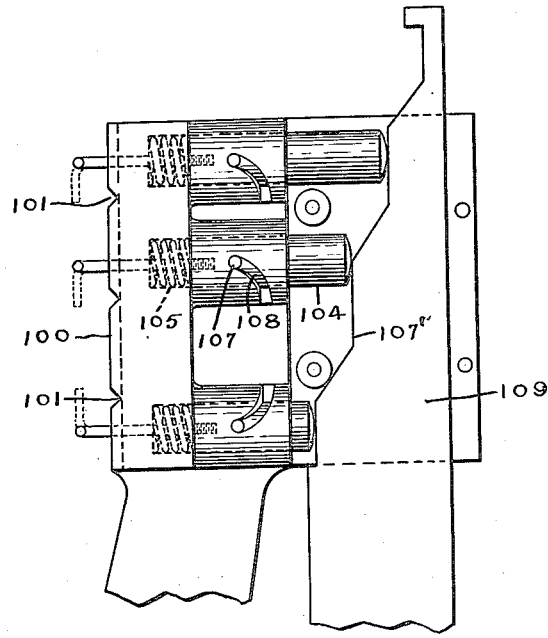

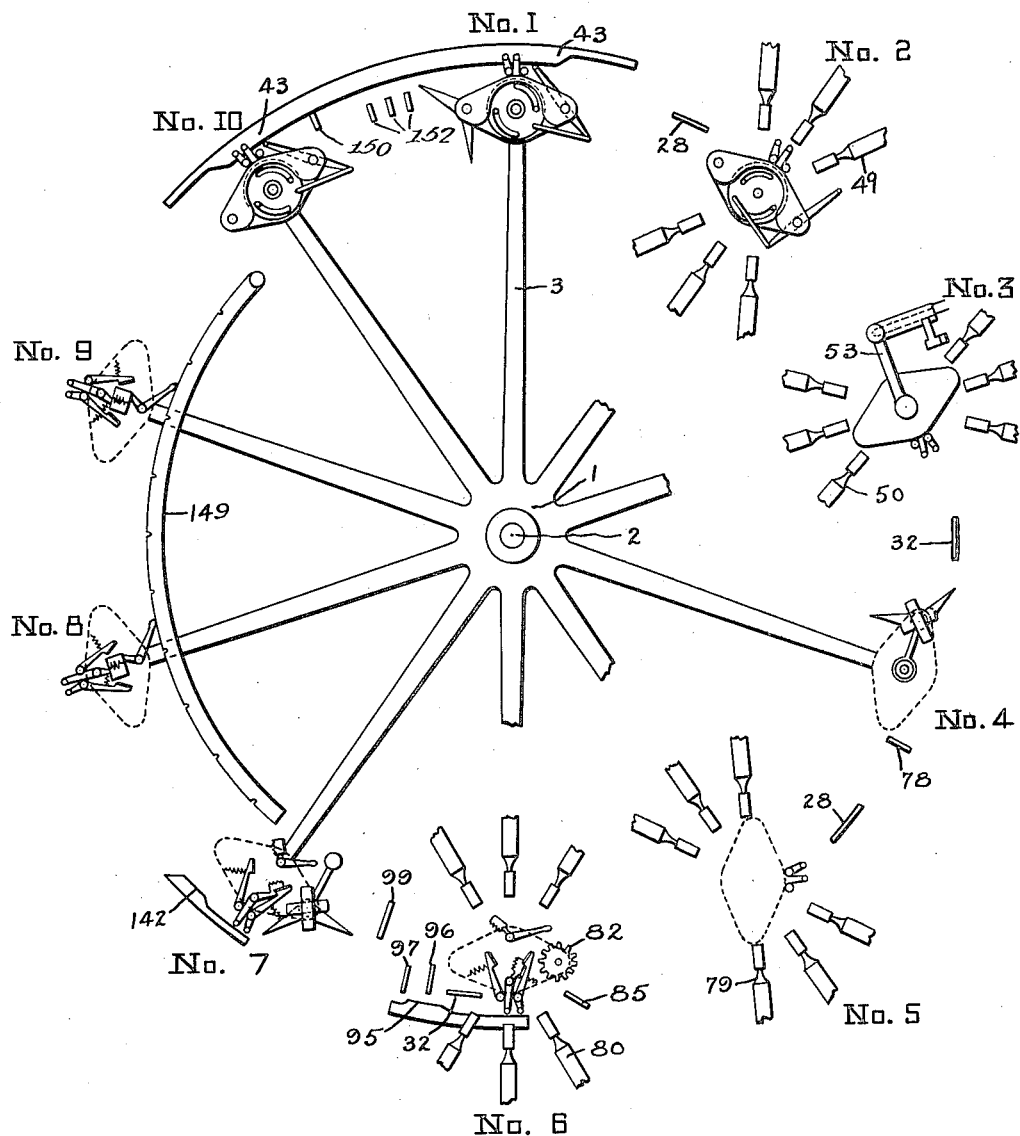

N. MARSHALL.
LAMP MAKING MACHINE.
APPLICATION FILED DEC. 28, 1908.
1,132,277.
Patented Mar. 16, 1915.
7 SHEETS—SHEET 2.
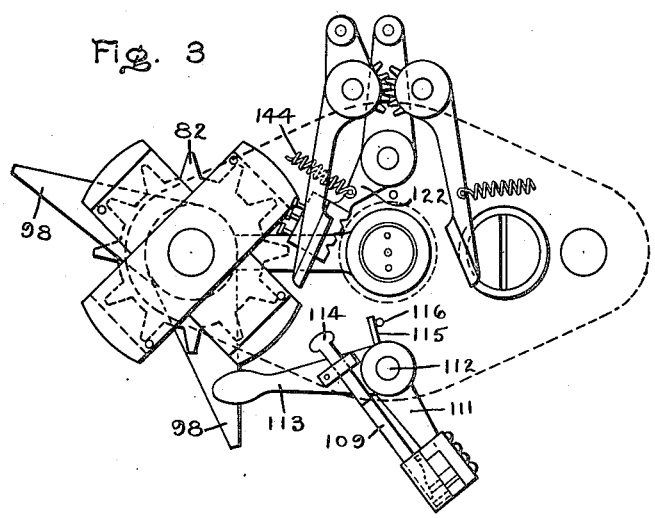
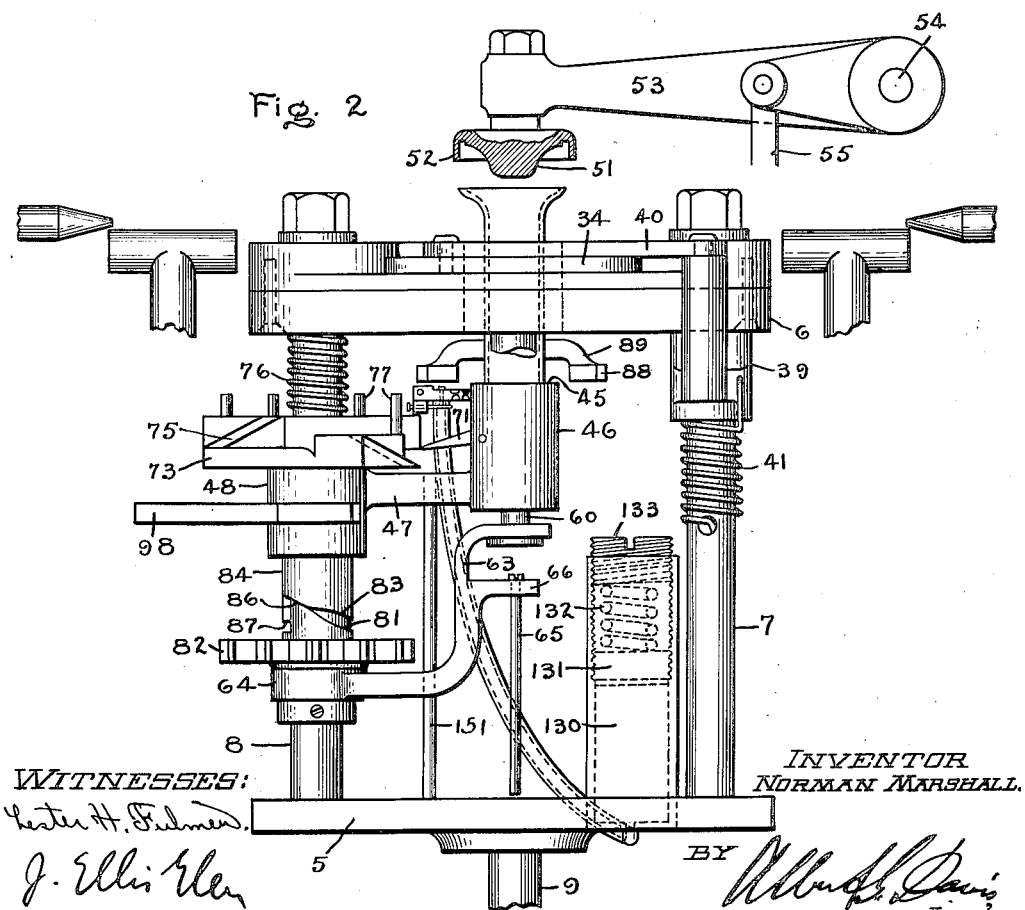

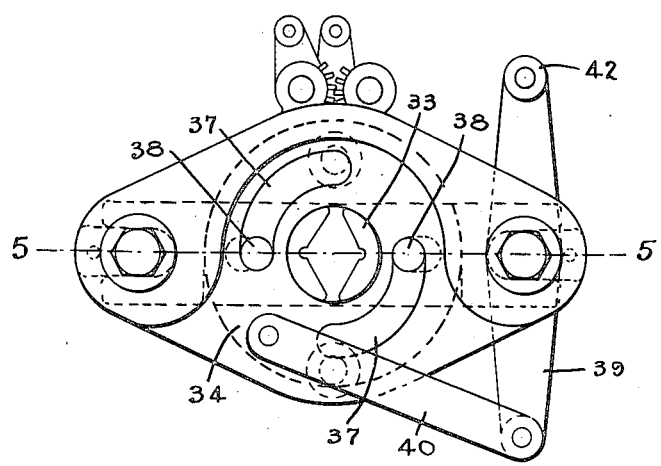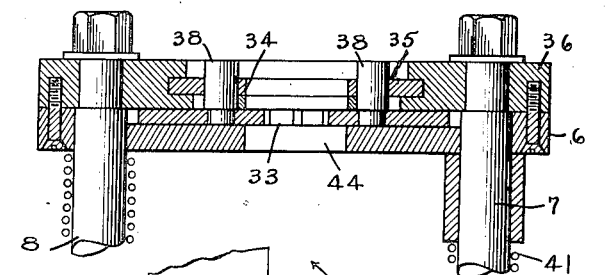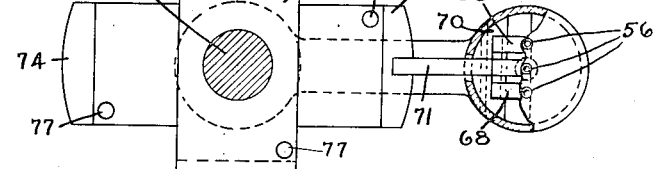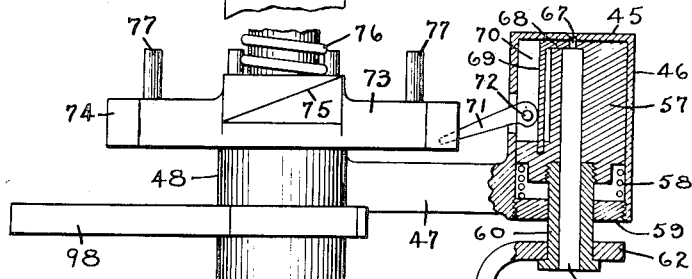

N. MARSHALL.
LAMP MAKING MACHINE.
APPLICATION FILED DEC. 28, 1908.
1,132,277.
Patented Mar. 16, 1915.
7 SHEETS—SHEET 4.
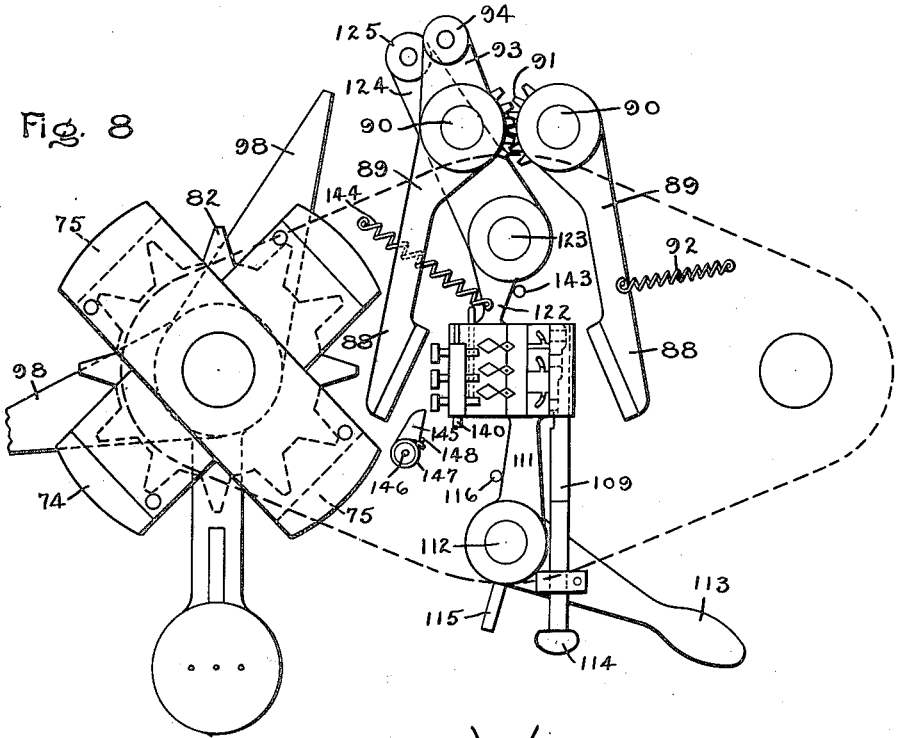
Fig. 8
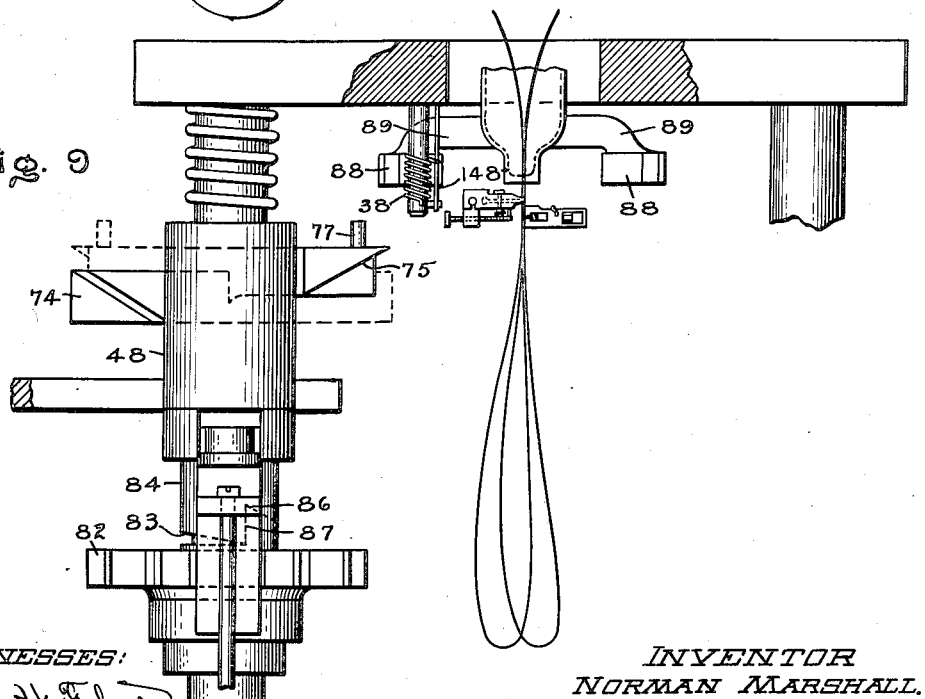
Fig. 9
WITNESSES:
INVENTOR
NORMAN MARSHALL.
BY
ATT'Y.

N. MARSHALL.
LAMP MAKING MACHINE.
APPLICATION FILED DEC. 28, 1908.
1,132,277.
Patented Mar. 16, 1915.
7 SHEETS—SHEET 6.
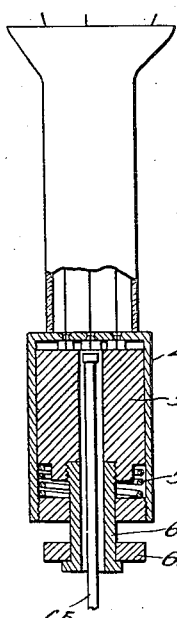
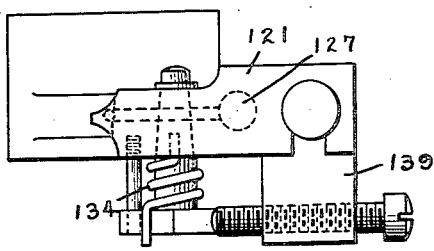
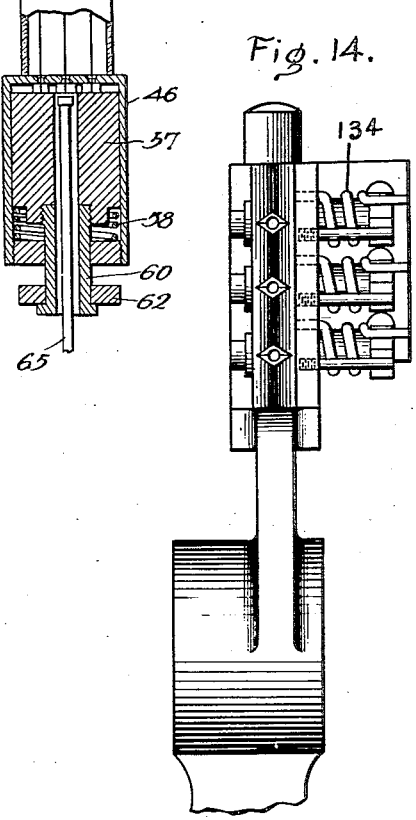
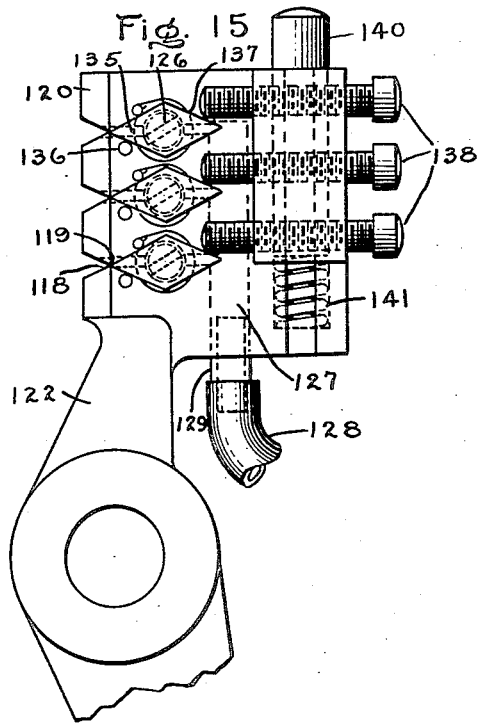
WITNESSES:
INVENTOR
NORMAN MARSHALL.
BY
ATT'Y.

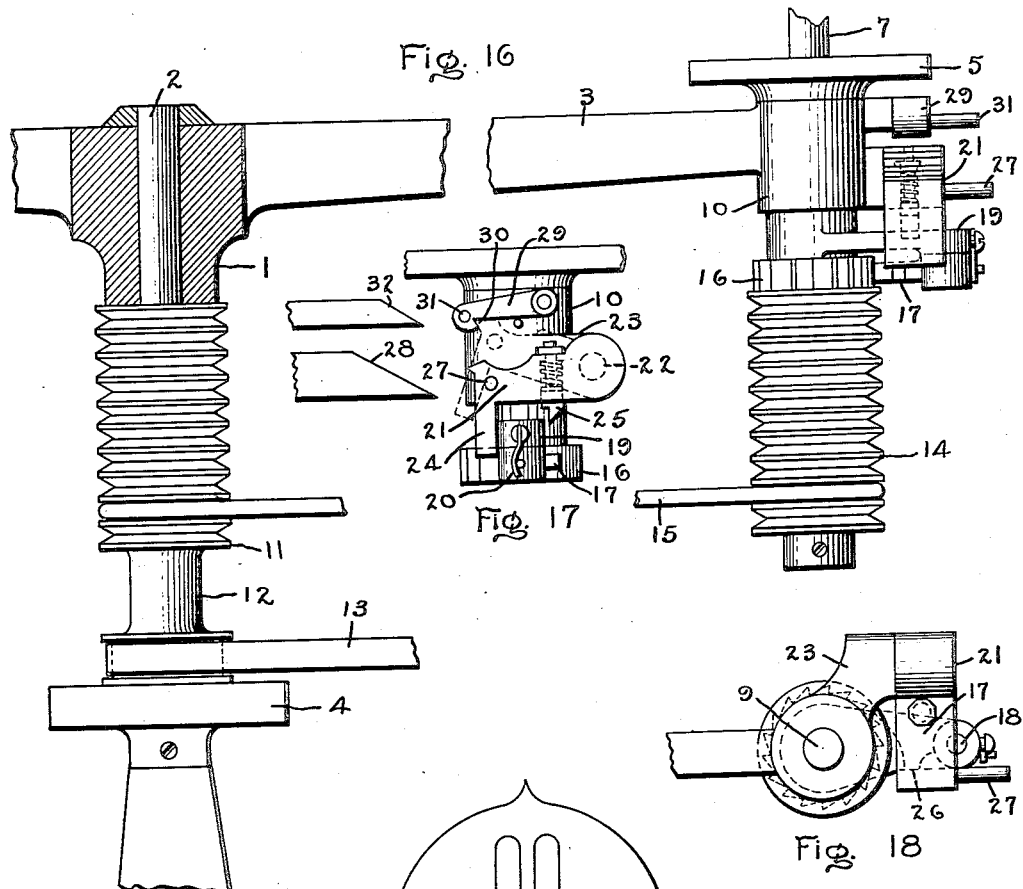
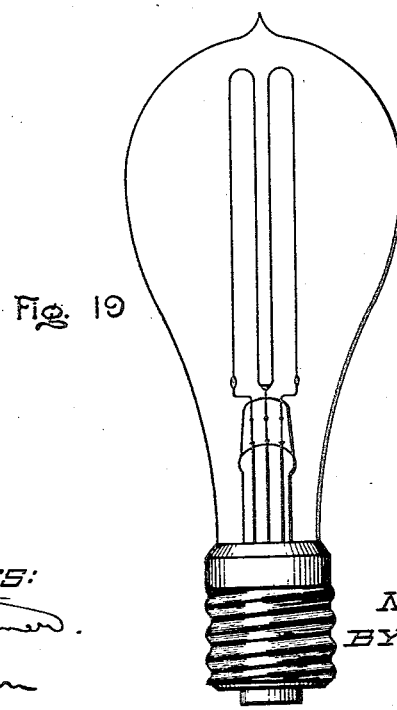

UNITED STATES PATENT OFFICE.

NORMAN MARSHALL, OF NEWTON, MASSACHUSETTS, ASSIGNOR TO GENERAL ELECTRIC COMPANY, A CORPORATION OF NEW YORK.

LAMP-MAKING MACHINE.

1,132,277. Specification of Letters Patent. Patented Mar. 16, 1915.

Application filed December 28, 1908. Serial No. 469,650.

*To all whom it may concern:*

Be it known that I, NORMAN MARSHALL, a citizen of the United States, residing at Newton, county of Middlesex, State of Massachusetts, have invented certain new and useful Improvements in Lamp-Making Machines, of which the following is a specification.

The invention relates to apparatus for use in the manufacture of incandescent lamps, and more especially for use in the manufacture of the stems which carry the leading-in wires and the attached filament or filaments.

Heretofore in the manufacture of incandescent lamps it has been the common practice to secure the filament ends to the stem wires by manual manipulation of the stems and filaments, and the unequal spacing and positioning of the stem wires in the stems as heretofore formed has required that the ends of the filaments be secured to the stem wires successively. It has been proposed to facilitate the operations incident to securing the filament ends to the stem wires by utilizing apparatus embodying jigs or holders for positioning the stem wires and filament ends, and to perform certain of these operations automatically. The positioning devices of such apparatus have usually been constructed to position a single filament end and stem wire, and it has therefore been proposed to increase the efficiency of such apparatus by providing means for simultaneously positioning and securing the filament ends to the different stem wires, but the employment of such devices required either the repeated adjustment of the positioning devices to suit the varying positions of the stem wires in successive stems, or the sorting of the stems, either of which operations caused a loss of time with a resulting reduction in the efficiency of the apparatus.

In accordance with one of the features of the present invention, the stem wires are accurately positioned and maintained in definite relation to each other during the closing of the end of the stem about the wires so that the stem wires in different stems are uniformly spaced and are also positioned to project a uniform distance beyond the end of the stem. This feature may be embodied with advantage in machines which do not embody the other features of the invention to be referred to, since the uniform spacing and positioning of the stem wires enables the use of devices by which the ends of the filament or filaments may be rapidly and conveniently brought into proper relation to the stem wires to which they are to be secured, and the simultaneously securing of the filament ends and stem wires together. This uniform spacing and positioning of the wires therefore enables devices to be used in securing the filament ends to the stem wires by which a material reduction in the time and consequently a reduction in the cost of manufacture may be effected.

A further feature of the invention contemplates the use in connection with the devices for forming the stems and positioning the stem wires, of devices for holding a filament or filaments, as the case may be, with the filament ends positioned in a manner corresponding to the positions of the stem wires and bringing the filaments into position with the ends close to the stem wires so that the filaments may be readily united with the stem wires.

A further feature of the invention contemplates the provision of means for automatically supplying cement to the filament ends and stem wires after they have been brought into proper relation to each other in the manner above referred to.

In an apparatus embodying all the features above referred to, the glass tubes from which the stems are formed are introduced into the machine, the stem wires are introduced into the wire positioning devices, the ends of the glass tubes are fused and molded about the stem wires, the position of the stem wires being accurately maintained during the sealing of the end of the tube, the filament or filaments are introduced into the filament holding devices, the filament ends and stem wires are brought into close relation, the cement is applied to the wires and filaments and allowed to dry, and then the completed stem with the filament or filaments secured to the stem wires is removed ready for the insertion of another glass tube. By combining the devices for forming the stems and positioning the stem wires with devices for carrying the filaments and with devices for applying cement, the operations incident to the manufacture of the stems and the securing of the filaments to the stem wires may be rapidly and conveniently performed without the handling and re-handling of the parts to be assembled which has heretofore been required, and thereby the rapidity of the operations is materially increased and the cost of production correspondingly decreased.

In embodying the broader features of the invention in an apparatus which will enable the required operations to be rapidly and conveniently performed, I have employed various other features of invention, which, while they are not essential to the broad features, are of importance in contributing to the efficiency of the machine.

The various features of the invention will be understood from an inspection of the accompanying drawings and the following detailed description of the apparatus shown therein. In these drawings the illustration of many of the operating devices for giving the required movements to various parts of the apparatus are to a large extent diagrammatic, no attempt having been made to show the specific details of such operating devices.

Figure 11:
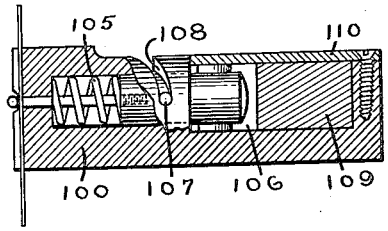
Figure 12:
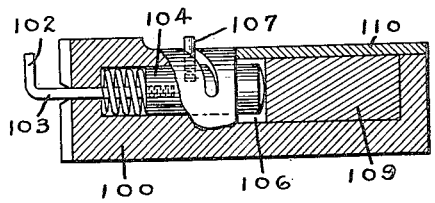

In the drawings, Figure 1 is a diagrammatic plan view showing an apparatus embodying the various features of the invention; Fig. 2 is an elevation of one of the heads which carry the devices which coöperate in forming the stems and cementing the filaments to the stem wires; Fig. 3 is a diagrammatic plan view showing certain parts carried by the head; Fig. 4 is a plan view of the head showing the tube carrying jaws; Fig. 5 is a detailed sectional view on line 5—5 of Fig. 4; Fig. 6 is a detail plan view of the wire positioning and holding devices; Fig. 7 is a detail elevation of the same, partly in section; Fig. 8 is a view similar to Fig. 3 on an enlarged scale and showing certain of the parts in a different position; Fig. 9 is a detail elevation, partly in section, showing the parts in the position indicated in Fig. 8; Figs. 10, 11 and 12 are details showing the construction of the filament carrying devices; Figs. 13, 14 and 15 are detail views showing the construction of the cement laying devices; Figs. 16, 17 and 18 are detail views showing the construction of the devices for rotating and starting and stopping the heads shown in Fig. 2; Fig. 19 is a view showing a lamp with one form of stem which may be made on this machine, and Fig. 20 is a detail view showing the leading-in wires in position in the stem.

In the apparatus illustrated in the drawings there is a circularly arranged series of heads mounted upon a rotary carrier which is intermittently revolved to bring each head successively into the positions where the various operations incident to the forming of the stems and the securing of the filaments to the stem wires are performed. The carrier for carrying the heads consists of a central hub 1 secured upon the upper end of a shaft 2 and provided with a series of radially extending arms 3 upon the outer ends of which the heads are mounted. As shown, there are ten arms and the heads are brought successively into ten different positions by the intermittent clockwise rotation of the carrier, the carrier remaining at rest for an interval of time between each partial revolution. The intermittent rotation of the carrier may be effected through any suitable intermittent driving mechanism connected with the shaft 2 through the gear 4 indicated in Fig. 16.

Each head comprises a base plate or bar 5, an upper plate 6 and two pillars 7 and 8. This head is secured upon the upper end of a shaft 9 mounted in a bearing 10 at the end of one of the arms 3 of the carrier, and the head is rotated at suitable intervals and its rotation arrested with the parts in a fixed position at the required time by any suitable mechanism, such as that indicated in Figs. 16 to 18. As here shown, a series of pulleys 11 are formed on a sleeve 12 which is loosely mounted on the shaft 2 and is continuously driven by a belt 13. Each of the head carrying shafts 9 has loosely mounted upon its lower end a series of pulleys 14, which are provided on each head carrying shaft merely for convenience in manufacturing and setting up the machines, and each head is connected with one of the driving pulleys 11 by a belt 15 passing over one of the pulleys 14 and a corresponding pulley 11.

The sleeve on which the pulleys 14 are formed has secured to its upper end a ratchet wheel 16 which is adapted to be engaged by a pawl 17 pivoted at 18 on an arm 19 which is secured to the head carrying shaft 9, the pawl 17 being swung into engagement with the ratchet wheel 16 by a spring 20. When the pawl is in engagement with the ratchet wheel the head carrying shaft 9 is continuously rotated, but when the pawl 17 is disengaged from the ratchet wheel the pulley 14 and ratchet wheel rotate idly upon the head carrying shaft, which remains at rest until the pawl 17 is again engaged with the ratchet wheel. For the purpose of disengaging the pawl from the ratchet wheel and arresting the rotation of the head carrying shaft with the shaft in a definite position, a stop arm 21 is provided. This stop arm is pivoted at 22 upon a boss 23 formed on the bearing 10 and is provided with a downwardly projecting finger 24 adapted to be moved into and out of the path of the pawl 17 and pawl carrying arm 19, and is also provided with a spring pressed latch 25 adapted to project down behind the pawl carrying arm 19 when the rotation of the arm is arrested by the finger 24.

Assuming the parts to be in the position indicated in Figs. 16, 17 and 18, which is the position they occupy when the head carrying shaft is at rest, the pawl carrying arm 19 lies between the stop finger 24 and the latch 25, and the pawl 17 is held back against the tension of the spring 20 by the engagement of its front face 26 with the finger 24. The head on the head carrying shaft is thus held in fixed position on the carrier and the pawl 17 is held out of engagement with the ratchet wheel 16. When the head carrying shaft is to be rotated a pin 27 which projects laterally from the stop arm 21 rides up the inclined end of a starting cam 28, thus lifting the arm 21 so that the stop finger 24 is moved out of the path of the pawl carrying arm 19 and out of engagement with the front side of the pawl. When the stop arm is thus raised it is held in raised position by a pivoted latch 29 which engages a projection 30 on the arm. When the stop arm is raised the pawl 17 immediately engages the ratchet wheel 16 and the pawl carrying arm and head carrying shaft are driven from the ratchet wheel 16. When the rotation of the head carrying shaft is to be arrested a pin 31 which projects laterally from the latch 29 rides up the inclined end of a stopping cam 32 so that the stop arm 21 is allowed to fall into the full line position indicated in Fig. 17. Now when the pawl carrying arm 19 comes around, the front face of the pawl 17 strikes the arm 24 so that the pawl is disengaged from the ratchet wheel and the arm 19 brings up against the stop finger 24 so that the rotation of the head carrying shaft is arrested. As the arm 19 comes against the finger 24 it rides under the latch 25 which yields to allow it to pass and then advances into position back of the arm so that the arm is locked in fixed position between the latch and finger 24. In Fig. 17 the cams 32 and 28 are shown one above the other, but it will be understood that this illustration is diagrammatic, and that these cams are arranged at proper intervals to secure the starting and stopping of the head carrying shafts at the desired points in the operation of the machine.

The glass tube from which the stem is formed is introduced into the machine either automatically or by hand when the head is in position marked No. 1 in Fig. 1 and is not rotating. The tube is introduced between the tube holding paws 33 which are mounted above the upper plate 6 of the head (Figs. 2, 4 and 5). The adjacent ends of these jaws are recessed to properly embrace and grasp the tube and the jaws are mounted to slide in guide grooves formed in the upper face of the plate 6. The jaws are opened and closed by means of a cam disk 34 mounted to rotate in a semicircular groove 35 formed in the edge of a plate 36 which is secured to the upper ends of the rods 7 and 8 and forms in effect a part of the upper plate of the head. The cam disk 34 is provided with two eccentric slots 37 which are engaged by pins 38 projecting upward from the gripping jaw 33. The cam plate is rotated to open and close the jaws by means of a lever 39 mounted upon the rod 7 and connected with the cam disk by a link 40. The lever 39 is supported upon a spring 41 which surrounds the rod 7 and tends to swing the lever into position to close the gripping jaws 33. The free end of the lever is provided with a roll 42. A fixed cam 43 is arranged in the path of the roll 42 and operates to swing the lever into the position indicated at No. 1 in Fig. 1 and open the jaws 33.

When the stem tube is inserted between the jaws 33 it extends down through an opening 44 in the upper plate 6 of the head, and the lower end of the tube rests upon a plate 45 at the upper end of a post 46, which is carried on an arm 47 projecting from a hub 48 loosely mounted on the rod 8.

As the head travels from the position No. 1 to the position No. 2, Fig. 1, the roll 42 at the end of the clamp operating lever 39 rides off of the cam 43 so that the clamping jaws 33 are closed and grip the stem tube. During this travel of the head the stop arm 21 is lifted by one of the starting cams 28 so that the driving mechanism for the head is thrown into operation and the head as it comes into the position No. 2 is being rotated. While the head is in the position No. 2 the upper end of the glass tube is acted upon by a series of blow pipe flames, the burners for which are indicated at 49, and the glass at the upper end of the tube is heated. When the head is brought into the position No. 3 it is still rotating, and the upper end of the glass tube is acted upon by a second series of blow pipe flames, the burners for which are indicated at 50. By the action of these blow pipe flames the glass is reduced to a plastic state so that its upper end may be molded or spun out to form the bell mouth at its upper end by means of the tool indicated at 51 in Fig. 2. This tool is provided with a central conical surface for spreading the upper end of the tube outward and is provided with a downwardly projecting flange 52 at the base of the conical surface which will act against the outer edge of the flared end of the stem, and thus insure the uniform shaping of the flared end of the stem. The shaping tool 51 is mounted upon an arm 53 which is pivoted at 54 and may be operated through a link 55 by means of a treadle or by means of a suitably timed operating mechanism.

As the head travels from position No. 3 to position No. 4, the latch 29 rides over one of the stopping cams 32 so that the rotation of the head is arrested and the head is locked in fixed position. While the head is in the position No. 4 the stem wires are introduced. In the construction of apparatus shown it is intended that these wires should be introduced manually by an operator in the manner in which they are commonly introduced into machines for making stems.

The apparatus shown is intended for use in the manufacture of that form of incandescent lamps in which, as shown in Fig. 19, there are three wires projecting from the end of the stem, two of the wires being the ends of the leading-in wires and the other being a wire for connecting the ends of two filaments, the other ends of which are connected to the leading-in wires. The devices for positioning and maintaining the stem wires in definite relation are therefore constructed and arranged to act upon three wires. It will be understood, of course, that in manufacturing stems to be used in lamps in which a single filament is secured to the leading-in wires and in which an anchor wire is connected to the center part of the filament, the wire positioning devices will be modified to suit the different conditions.

In the construction shown the ends of the leading-in wires which are introduced into the stem tube are inserted in small positioning holes 56 formed in the plate 45 and preferably slightly bell-mouthed to facilitate the introduction of the wires (Figs. 6 and 7). The post 46 is made hollow to receive a cylindrical block 57, which is held yieldingly against the under surface of the plate 45 by a spring 58 interposed between the block and a plug 59 screwed into the end of the post. A tubular screw 60 with a longitudinal opening 61 through it has its upper end threaded into the block 57 and passes loosely down through the plug 59 and through an arm 62 projecting from a bracket 63 carried by a collar 64 which is mounted on the rod 8. The head of the screw 60 is arranged to engage the arm 62 and arrest the upward movement of the block 57 when the post 46 is moved upward, as hereinafter explained.

The center stem wire is introduced into the middle positioning hole 56 by means of a rod 65 mounted in a support or arm 66 on the bracket 63 and in line with the hole 61 which extends up through the screw 60 and block 57. The upper end of the rod 65 is recessed to receive a wire which is placed by the operator in the holder 61 with the lower end of the wire in a recess in the end of the rod 65. The operator then slides the rod upward through the screw 60 and the block 57 until it is arrested near the upper end of the hole in the block 57. The wire then projects through the positioning hole 56 in the plate 45 and into the lower end of the stem tube the proper distance.

The positioning holes 56 for the stem wires extend through the plate 45 and register with a shallow slot 67 formed in the upper end of the block 57. One side of this slot 67 is formed by the laterally projecting ends 68 of a series of leaf or gripper springs 69 which are secured within a recess 70 in the block 57. The operator places the stem in position in the holder and with its lower end on the plate 45 as shown in Fig. 20 and then places the two outer leading-in wires in position with their lower ends extending through the holders 56 and into the slot 67, while the middle wire is brought into proper position by means of the rod 65 as above described. The lower ends of the wires are therefore all properly distributed with relation to each other and project into the slot 67 where they are firmly held by the fixed side of the slot 67 and the ends 68 of the leaf springs which form clamps for gripping the ends of the wires and holding them so that they will project a fixed distance below the upper surface of the plate 45.

The leaf springs 69 are forced forward to grip the ends of the wires and are allowed to spring back so as to release the ends of the wires at the proper times by a cam or gripper operating lever 71 which is pivoted at 72 in the block 57 and projects outward through an opening in the wall of the hollow post 46. The inner end of the cam lever is so shaped that when the outer end of the lever is swung into its upper position the springs 69 will be operated to clamp the ends of the stem wires, and when its outer end is swung into its lowest position the leaf springs will be released and allowed to spring back so as to free the ends of the stem wires.

The device indicated for swinging the gripper operating lever 71 consists of a cam plate 73 loosely mounted on the standard 8 and provided with four radially extending arms. The outer ends of these arms are provided with inclined cam surfaces 74 and 75, the cam surfaces 74 being formed on the arms which are diametrically opposite each other, and the cam surfaces 75 being formed on the other two diametrically opposite arms. The plate 73 stands normally in the position indicated in Figs. 3 and 8, in which position none of the cam surfaces on the plate register with the gripper operating lever 71. When the gripper operating lever is to be swung about its pivot to either operate or release the gripper, the plate 73 is given a quarter revolution in the direction of the arrow, Fig. 6. Assuming that the outer end of the lever is in its lower position, as indicated in Fig. 7, one of the cam surfaces 74 will ride under the end of the lever, lifting the outer end of the lever to its upper position and then pass from below the end of the lever. When the plate 73 is given another quarter revolution, one of the cam surfaces 75 will ride over the outer end of the gripper operating lever, swinging it downward into the position indicated in Fig. 7 and thus releasing the gripper. The plate 73 is stopped in the position into which it is rotated by being held in frictional engagement with the upper end of the hub 48 by a spring 76 surrounding the rod 8 and interposed between the upper surface of the plate and the under surface of the upper head-plate 6. The plate 73 is rotated at proper intervals during the travel of the head from position to position by pins 77 which project upwardly from the arms of the plate and engage with fixed cams or abutments 78 indicated in Fig. 1.

After the wires have been inserted in the positioning holes 56 the head travels from the position No. 4 to position No. 5. During this travel one of the pins 77 rides against one of the abutments 78, turning the plate 73 through a quarter revolution. During this movement of the plate 73 one of the cams 74 operates the lever 71 to effect the gripping of the ends of the wires. During this travel of the head the stop arm 21 is raised by one of the starting cams 28 and the head is set into rotation. While the head is in position No. 5, the lower end of the stem tube is acted upon by a series of blow pipe flames, the burners for which are indicated at 79, and a preliminary heating of the lower end of the tube is effected. The head then travels from the position No. 5 to position No. 6, the rotation of the head still continuing. While the head is in position No. 6 the lower end of the stem tube is acted upon by a series of blow pipe flames, the burners for which are indicated at 80. By the action of these flames the lower end of the glass tube is fused, and while the end of the tube is in a semi-molten state the devices for molding the end of the tube operate.

As the lower end of the tube fuses under the action of the blow pipe flames the molten glass shrinks or lifts upward. In the construction of the present machine the accurate spacing and positioning of the wires in the fused glass at the end of the stem tube is insured by causing the plate 45 in which the wire positioning holes are formed to gradually rise and follow up the glass as it shrinks upward during the fusing operation, the result being that the wires are accurately maintained in position at the point where they emerge from the end of the stem, and always project the same distance beyond the end of the tube. The upward movement of the plate against the molten end of the tube also results in an accurate shaping of the end of the tube so that the ends of the stems are of uniform and even shape. While the glass is in the plastic condition, the sides of the lower end of the tube are pressed inward to flatten the tube at this point and insure the sealing of the end of the tube about the wires.

The means for raising the plate 45 during the fusing of the end of the stem tube in the manner above described comprises a cam 81 formed on the upper end of a sleeve which is mounted to rotate on the rod 8, and forms the hub of a star wheel 82 (Figs. 2, 3, 7, 8 and 9). The lifting cam 81 engages a corresponding surface 83 formed on the lower end of an extension 84 of the hub 48 which carries the cylinder 46 and plate 45. During the fusing of the lower end of the tube one of the teeth of the star wheel 82 strikes against an abutment 85 (Fig. 1) at each revolution of the head so that the star wheel and cam 81 are intermittently rotated to gradually raise the plate 45 as the fusing progresses. During this upward movement the head of the screw 60 by its engagement with the arm 62 holds the block 57 and gripper springs 69 stationary so that the plate 45 slides up the wires. Thus the relative positions of the wires at the points where they emerge from the fused glass is maintained and accurately determined, and the extent to which they project from the end of the finished stem is also accurately determined.

During the time that the head is in position No. 6, it is given such a number of revolutions that the rotation of the star wheel 82 brings the high part 86 of the cam 81 under the part 87 of the cam surface 83, so that as the head leaves the position No. 6 the plate 45 is in its highest position.

As the head travels away from the position No. 6, the latch 29 of the stopping and starting mechanism rides over one of the stop cams 32, thus stopping the rotation of the head. Immediately after the stopping of the head, and while the plate 45 is still held in its highest position, the devices for pressing the sides of the stem 2 are operated. These devices comprise two presser plates 88 secured upon the ends of two arms 89 which are pivoted to the upper plate 6 of the head at the points 90, and are connected so that they operate in unison by intermeshing segmental gears 91 formed on the hubs of the arms. The presser carrying arms 89 are maintained in their retracted position by means of a spring 92 secured to one of the arms and to the plate 6. The arms are moved inward against the tension of the spring to bring the presser plates 88 into engagement with the end of the tube by means of an arm 93 projecting from the hub of one of the arms 89 and carrying at its outer end a roll 94.

As the head moves from the position No. 6, and immediately after the rotation of the head has been arrested, the roll 94 rides against a cam 95 (Fig. 1), which moves the arm 93 in a direction to swing the arms 89 inward and press the presser plates against the end of the stem tube.

After the end of the tube has been thus shaped and molded the lower ends of the stem wires are released by the clamp springs 69. This unclamping of the wires is effected by an abutment 96 which is arranged in the path of the pins 77 on the clamp operating cam plate 73 and operates to swing said plate through a quarter revolution. During this movement of the cam plate 73 one of the cam surfaces 75 acts on the outer end of the clamp-operating lever 71, springing it into the position indicated in Fig. 7, so that the springs 69 may move back to release the ends of the stem wires.

Immediately after the wire gripping devices are disengaged from the ends of the wires one of the teeth on the star wheel 82 strikes against an abutment 97 turning the star wheel and cam 81 sufficiently to carry the high part 86 of the cam from below the part 87 of the cam 84 so that the part 87 drops off of the high part 86, allowing the block 57 and clamping jaws to drop below their starting position, shown in Fig. 7, and permitting the plate 45 to return to its lowest position indicated in Fig. 9. This downward movement of the plate 45 frees the stem wires from the positioning holes 56 in the plate 45 so that the plate may be swung laterally from under the lower end of the stem.

Immediately after the ends of the stem wires have been thus freed from the plate 45, and during the travel of the head from the position No. 6 to the position No. 7, the post 46 on which the plate 45 is carried is swung laterally from under the stem so as to leave the space below the stem free. The devices for effecting the lateral movements of the post comprise two arms 98 which project radially from the hub 48. During the travel of the head from position No. 6 to position No. 7, one of the arms 98 rides against the abutment 99, which acts to swing the arm and hub 48 about the rod 8 and to bring the post 46 into the position indicated in Figs. 8 and 9, and in position No. 7 of Fig. 1.

While the head is in the position No. 7, the filaments are inserted in the filament holding devices by the operator, and these devices are swung into position to bring the filament ends into engagement with or close to the projecting ends of the stem wires.

The construction of the filament holding and carrying devices embodied in the apparatus being described is best shown in Figs. 8 to 12. As here shown the filament holding and carrying devices are constructed to position and carry two filaments, one end of each filament being held in position for attachment to the center stem wire and the other end of each filament being held in position for attachment to one of the outer stem wires. These filament holding devices comprise a plate 100 provided in its front edge with three positioning recesses 101 which are substantially V-shaped for convenience in introducing the filaments. These positioning recesses 101 are the same distance apart as the stem wire positioning holes 56 in the plate 45, and therefore the ends of the filaments which project above the plate 100 will be spaced to correspond to the spacing of the stem wires. The devices for holding the filaments in the positioning recesses 101 consist of clamp fingers 102 formed on the outer ends of rods 103 which are connected with plungers 104 mounted within recesses formed in the plate 100. These clamp carrying plungers are forced rearwardly by springs 105 and their rear ends project into a recess 106 formed in the plate 100. Each plunger is provided with a radially projecting pin 107 which engages a spiral cam groove 108. With this arrangement, when the plunger 104 is forced forward to carry the clamp finger 102 into inactive position the pin 107 riding in the cam groove 108 causes the plunger and clamping rod to be rotated so as to swing the clamping finger laterally from in front of the recess 101. This enables the filaments to be more conveniently and quickly introduced into the positioning recesses. When the plunger is released the spring acts to return the clamping finger into clamping position, the cam groove 108 acting on the pin 107 to swing the clamping finger so that it lies across the positioning recess 101. The opening and closing of the clamping fingers is effected and controlled by means of a cam slide 109 mounted in the recess 106 and held therein by a plate 110. The filament positioning and carrying plate 100 is formed upon the end of an arm 111 which is pivoted at 112 to the upper plate 6 of the head and is provided with an operating handle 113. The cam slide 109 extends into position where it may be conveniently operated by the operator and is provided with an operating handle 114. The arm 111 which carries the filament positioning devices normally stands in the position indicated in Fig. 3, which is determined by the engagement of a pin 115 with a stop pin 116 on the head plate 6.

When the head comes into the position No. 7, an operator introduces the filaments into the positioning recesses 101 in such manner that the upper ends of the filaments project somewhat above the upper surface of the plate 100, as indicated in Fig. 11. The operator then draws back the cam slide 109 so that the supporting surfaces 107′ are withdrawn from behind the clamp carrying plungers 104, allowing the clamps to be brought into engagement with the filaments to hold them in position in the positioning recesses. The operator then swings the filament carrying lever 111 forward into the position indicated in Fig. 8, which is determined by the engagement of the front side of the arm with the stop pin 116. This brings the filament ends into close relation with the stem wires as indicated in Fig. 9.

While the stem wires and filament ends are held in the position indicated in Fig. 9, cement is supplied to the wires and filament ends. The cement supplying devices which are embodied in the apparatus being described are best shown in Figs. 2, 3, 8, 9 and 13 to 15. As here shown, the cement which is to be applied to a stem wire and the adjacent filament end or filament ends is presented to the wire and filament end in the form of a small globule carried in a substantially V-shaped recess 118 formed at the mouth of a tube or passage 119 through which cement is forced just previous to the application of the cement to the wire and filament end. By thus carrying the cement in a substantially V-shaped recess or recess having converging sides which forms the mouth of the cement passage, a comparatively large globule of cement may be presented to the wire and filament end, and may be applied thereto in such manner as to effectively unite them. With this construction also the globule of cement frees itself from the recess when the cement applying devices are moved away from the filament end and stem wire, leaving the cement upon the wire and filament end so that the recess is substantially free from cement. The cement applying device does not, therefore, become clogged so that the cement will not be properly supplied. The three cement carrying recesses 118 are formed in the wedge-shaped front edge 120 of a plate 121. By thus forming the cement carrying recesses in a wedge-shaped carrier the freeing of the globule of cement from the recess when the carrier is moved away from the stem wires and filaments, is facilitated, and the reliability of the device and length of time during which it may be operated without requiring attention, is increased.

The cement carrying plate 121 is formed on the end of one arm 122 of the lever which is pivoted at 123 to the head plate 6. The other arm 124 of the lever projects beyond the head-carrying plate, and is provided with an operating roll 125 through which movements are imparted to the lever to carry the cement carrying plate to and from the stem wires and filament ends.

Cement is supplied to the cement passages 119 through valves 126 which control communication between these passages and a supply chamber 127 formed in the plate 121. The supply of cement under proper pressure is maintained in the supply chamber 127 through a flexible tube 128, the upper end of which is connected with a tube 129 leading to the chamber 127, and the lower end of which is connected with the lower end of a reservoir 130 carried on the head plate 5, as best shown in Fig. 2. The cement within the reservoir 130 is subjected to pressure by means of a piston 131 which is forced down upon the cement by a spring 132. The tension on the spring may be adjusted by a plug 133 screwed into the upper end of the reservoir, and engaging the upper end of the spring 132.

The cement supplying valves 126, as shown in Figs. 13, 14 and 15, are held normally closed by coiled springs 134 which force the valve operating plates 135 against fixed stops 136. The valve operating plates 135 are secured to the outer ends of the valve stems and are provided with inclined surfaces 137 arranged to be operated upon by the ends of adjustable screws 138. The screws 138 are carried in a slide 139 which is connected with a plunger 140. The plunger is mounted in a recess in the plate 121 and is held yieldingly with its end projecting beyond the end of the plate 121 by spring 141. When the plunger 140 is in its normal position the ends of the screws 138 are out of contact with the surfaces 137 on the valve operating plates and the valves are held in position to cut off communication between the chambers 127 and the cement passages 119. When the plunger 140 is forced inward the ends of the screws 138 act against the valve operating plates and swing the valves into position to open communication between the supply chamber 127 and the cement passages 119. The extent of opening between the chamber and passages depends upon the adjustment of the screws 138 and may be varied to suit the condition under which the machine is operating.

As the head travels from position No. 7 to position No. 8 the operating roll 125 for the cement carrying devices rides against a cam 142 (Fig. 1) which acts to swing the cement carrying plate 121 toward the stem wires and filament ends and to bring the lever 122 into position against a stop 143 (Fig. 8). When the cement carrier is in this position the cement carrying recesses 118 embrace the filament ends and stem wires, as indicated in Figs. 8 and 9, and the globules of cement which have been forced out into these recesses are applied to the filament ends and stem wires. The cement carrier is held normally retracted by a spring 144, as indicated in Fig. 3. As the cement carrier is moved from this position into the position indicated in Fig. 8, the end of the plunger 140 rides against the end of a cam arm 145 which is pivoted at 146 to the head plate 6, and acts to force the plunger in as the end of the plunger passes by the end of the cam arm, thus allowing a certain quantity of cement to be forced through the cement passages 119. On the return movement of the cement carrier the cam arm 145 yields against the tension of the spring 147 which holds it yieldingly against a stop 148 and allows the plunger to pass idly by. As soon as the plunger has passed beyond the end of the cam arm, the cam arm is returned into position against the stop 148 ready to operate the plunger on the next movement of the cement carrier toward the stem wires and filament ends. After the cement has been thus applied to the filament ends and stem wires, the roll 125 rides off the cam 142 and the spring 144 acts to return the cement carrier to its normal position.

After the cement has been thus applied the head travels through positions Nos. 8 and 9 and during this time the cement is allowed to dry and harden. A heating device such as a pipe 149, as shown in Fig. 1, for directing hot air against the cement may be provided for heating and drying the cement during the travel of the head from position No. 7 to position No. 10. As the head comes into position No. 10 the roll 42 on the end of the clamp operating lever 39 rides against the front end of cam 43, which swings the lever into the position indicated in Fig. 1, thus opening the jaws of the tube-holding clamp so that the finished stem with the filament cemented to the stem wires may be removed preparatory to the introduction of a fresh stem tube when the head comes into the position No. 1. The rod 65 is returned to its lower position while the head is in this position.

As the head travels from position No. 10 to position No. 1, one of the arms 98 on the hub which carries the post 46 and wire positioning plate 45 rides against an abutment 150, shown in Fig. 1, which coöperates with the arm in swinging the post 46 and plate 45 into position beneath the tube holding clamps, the arm 47 being brought against a positioning stop 151, shown in Fig. 2. The star wheel 82 then moves past a series of fingers 152, shown in Fig. 1, which act to rotate the wheel and cam 81 a sufficient distance to raise the base 46 and plate 45 into position to be engaged by the end of the stem tube. During this movement of the post the block 57 moves therewith and the head of the screw 60 is brought against the arm 62 as shown in Fig. 7. The parts are now in position ready for the insertion of another stem tube, and in position for the introduction of the stem wires for this tube.

While in the machine which has been described it is intended that certain parts shall be inserted manually, and that movement of certain of the devices for handling the parts to be assembled is effected manually, while the movement of other of such devices is automatically effected during the operation of the machine, it will be understood that so far as the broader features of the invention are concerned, the manner in which the parts to be assembled are introduced and the manner in which the movements of the devices for handling these parts are effected, is not material, and may be varied as found most desirable or economical in adapting the particular apparatus in which the features of the invention are embodied to the conditions under which the apparatus is to operate.

It will also be understood that the specific construction and arrangement of the various parts is not essential, except in so far as the specific arrangement or construction may be referred to in the claims.

What I claim as new, and desire to secure by Letters Patent of the United States, is,—

1. In a stem forming machine, the combination with means for holding a stem tube and means for heating one end of said tube, of a shaping tool for flaring out said tube provided with a surface diverging from the axis of rotation of the heated tube to a point outside the walls of said tube and a member mounted at the outer end of said surface to engage and smooth the edge of the flare produced on said tube by said surface; means for moving said tool into engagement with the heated end of said tube, and means for simultaneously producing relative rotation of said tube and tool while said tool is in engagement with the heated end of said tube.

2. In a stem forming machine, the combination with a stem support for holding a stem tube with one end projecting from said support, and means for heating the projecting end of the tube, of a conical shaping tool for flaring out the end of the tube, said conical shaping tool having at the base a diameter substantially greater than that of the tube and provided at the outer edge of the base with a flange for engaging and smoothing the flared edge of the stem tube, means for moving said tool longitudinally of said tube and into and out of engagement with the end thereof, and means for simultaneously producing relative rotation of said tube and tool while said tool is in engagement with the heated end of said tube.

3. In a stem forming machine, the combination with a movable carrier and a stem holder mounted to rotate on said carrier and arranged to hold the stem tube in alinement with its axis of rotation, of means for heating the end of the stem tube, a non-rotatable flaring and shaping tool mounted to move in alinement with the axis of rotation of the stem tube, said tool having a surface inclined to said axis to flare out the tube and extending beyond the walls of said tube, a shaping member with a surface parallel to said axis and beyond the walls of the tube to engage and smooth the edge of the tube when flared, and means for bringing said non-rotatable tool into engagement with the heated end of the rotating stem tube during the rotation of said support.

4. In a stem forming machine, the combination of a device for preventing displacement of the stem wires during the fusing of the tube and the sealing in of said wires, and means for causing said device to follow and press upon the end of the tube as said tube fuses and the end thereof retreats.

5. In a stem forming machine, the combination with means for holding the stem tube and fusing the end of the tube, of a pressing member mounted to move longitudinally of the stem tube and into engagement with the fused end thereof, and means for moving said pressing member longitudinally of the tube to press the fused end of the tube during the fusing of the tube around the stem wires.

6. In a stem making machine, the combination with means for sealing the end of the stem tube, of a pressing member mounted to move along the leading-in wires into engagement with the fused end of the tube, and means for moving said member a definite distance along the leading in wire while in engagement with the end of the stem tube during fusing.

7. In a stem forming machine, the combination with a device for holding a stem tube and fusing the end of said tube, of a wire guide for preventing lateral movement of the stem wires, said guide being mounted for movement toward the fused end of said tube, and means for automatically moving said guide toward the tube as the tube is fused.

8. In a stem forming machine, the combination with means for holding the stem tube and fusing the ends of the tube, of wire gripping devices for holding the ends of the stem wires to prevent lateral displacement of the wires, a presser mounted between said device and said holding means and constructed to move longitudinally of the tube and into contact with the fused end of the tube, and means for automatically moving said presser to compress the fused end of said tube at a predetermined rate during the fusing of the tube.

9. In a stem forming machine, the combination with means for holding a stem tube and fusing the end of the tube, of means for holding the stem wires in position, devices for preventing lateral displacement of the stem wires during the fusing, and means for pressing both the fused end and the sides of said tube around the stem wires.

10. In a stem making machine, the combination with a support for holding a stem tube, of a wire gripping device mounted in alinement with the tube held in said support and arranged to grip the ends of the stem wires, and a wire guide for preventing lateral displacement of the stem wires, said guide being mounted to move longitudinally of said wires, and means for maintaining said guide in contact with the end of the stem tube during the fusing.

11. In a stem making machine, the combination with a stem tube support and means for fusing the end of a tube held in said support, of a stem wire gripping device in alinement with the tube and mounted to grip the ends of the stem wires, a wire guide mounted between the stem and said wire gripping device to prevent lateral displacement of the stem wires and to move longitudinally of the wires, and means for automatically moving said wire guide toward the stem a definite distance at a rate to keep it in contact with the stem during the fusing.

12. In a stem making machine, the combination with a rotatable stem tube support and means for fusing the end of the tube, of a presser mounted in alinement with the stem tube and movable longitudinally of the stem wires, and means automatically actuated by the rotation of said support for moving said presser along the stem wires toward the tube during the fusing.

13. In a stem making machine, the combination with a movable carrier and a stem tube support mounted on said carrier, of a stem wire gripping device mounted on said support in alinement with the tube held in said support to grip the ends of stem wires placed in the stem tube, and means actuated by the movement of said carrier for controlling said gripping device.

14. In a stem making machine, the combination with a movable carrier and a support for the stem tube mounted on said carrier, of gripping jaws mounted on said support in alinement with the tube held in said support to grip stem wires in the tube, and means controlled by the movement of said carrier for opening and for closing said stem wire gripping jaws at predetermined points in the movement of said carrier.

15. In a stem forming machine, the combination with a movable carrier, means mounted on said carrier for holding a stem tube, and means for fusing the end of the tube, of devices for preventing lateral displacement of the stem wires during the fusing, shaping devices for engaging and shaping both the end and sides of the fused tube, and actuating means for said shaping devices controlled by said carrier.

In witness whereof, I have hereunto set my hand this 23d day of December, 1908.

NORMAN MARSHALL.

Witnesses:
 IRA L. FISH,
 WARREN G. OGDEN.